(12) United States Patent
Hörner et al.

(10) Patent No.: US 6,997,693 B2
(45) Date of Patent: Feb. 14, 2006

(54) CASTING MOLD HALF AND CASTING MOLD FOR PRODUCING CONTACT LENSES

(75) Inventors: Wilhelm Hörner, Sulzbach (DE); Peter Hagmann, Erlenbach am Main (DE)

(73) Assignee: Novartis AG, Basel (CH)

( * ) Notice: Subject to any disclaimer, the term of this patent is extended or adjusted under 35 U.S.C. 154(b) by 332 days.

(21) Appl. No.: 10/267,377

(22) Filed: Oct. 9, 2002

(65) Prior Publication Data

US 2003/0077350 A1 Apr. 24, 2003

(30) Foreign Application Priority Data

Oct. 19, 2001 (EP) ............................................. 01811025

(51) Int. Cl.
*B29D 11/00* (2006.01)

(52) U.S. Cl. ..................... 425/174.4; 425/808; 249/134
(58) Field of Classification Search .............. 425/174.4, 425/193, 195, 808; 249/134; 264/1.36; 246/1.38
See application file for complete search history.

(56) References Cited

U.S. PATENT DOCUMENTS

| | | | | |
|---|---|---|---|---|
| 3,374,982 | A | 3/1968 | Sallade ........................ 249/121 |
| 3,380,718 | A | 4/1968 | Neefe ............................. 264/1 |
| 3,684,234 | A | 8/1972 | Clinebell ..................... 249/112 |
| 3,841,598 | A | 10/1974 | Grucza ......................... 249/61 |
| 3,971,841 | A | 7/1976 | Rubinstein .................. 264/275 |
| 4,113,224 | A | 9/1978 | Clark et al. .................. 249/105 |
| 4,121,896 | A | 10/1978 | Shepherd ..................... 425/808 |
| 4,211,384 | A | 7/1980 | Bourset et al. ............. 249/160 |
| 4,247,492 | A | 1/1981 | Neefe ......................... 264/2.3 |
| 4,495,117 | A | 1/1985 | Feurer et al. ................ 264/1.4 |
| 4,698,089 | A | 10/1987 | Matsuzaka et al. ........... 65/290 |
| 4,815,690 | A | 3/1989 | Shepherd ..................... 249/82 |
| 4,842,782 | A | 6/1989 | Portney et al. ............... 264/1.4 |
| 5,087,015 | A | 2/1992 | Galley ......................... 249/82 |
| 5,105,280 | A | 4/1992 | Ogino et al. ................. 358/298 |
| 5,114,114 | A | 5/1992 | Hara ........................... 249/60 |
| 5,158,717 | A | 10/1992 | Lai ............................. 264/1.1 |
| 5,158,718 | A | 10/1992 | Thakrar et al. ............... 264/1.4 |
| 5,252,056 | A | 10/1993 | Horner et al. ............... 425/555 |
| 5,274,008 | A | 12/1993 | Lai ............................. 523/107 |
| 5,508,317 | A | 4/1996 | Muller ......................... 522/85 |
| 5,702,735 | A | 12/1997 | Martin et al. ................ 425/548 |
| 5,782,460 | A | 7/1998 | Kretzschmar et al. ...... 264/1.36 |
| 6,311,967 | B1 | 11/2001 | Bicket ......................... 269/287 |
| 2002/0003315 | A1 * | 1/2002 | Ayyagari ................... 264/1.36 |

FOREIGN PATENT DOCUMENTS

| | | |
|---|---|---|
| EP | 0 226 123 | 6/1987 |
| EP | 0 255 088 | 2/1988 |
| EP | 0 264 255 | 4/1988 |
| EP | 0 366 356 | 5/1990 |
| EP | 0 255 535 | 6/1990 |

(Continued)

*Primary Examiner*—Donald Heckenberg
(74) *Attorney, Agent, or Firm*—Karen A. Borrelli; Robert J. Gorman (57) ABSTRACT

A casting mold half (5, 5a) for producing contact lenses comprises a mount (50) and an insert (51, 51a), which is arranged at one end of the mount (50) and can be connected to the mount (50) and which has a shaping surface (510) for the shaping of the front or rear surface of the contact lens to be produced. The insert (51, 51a) consists in the region of the shaping surface (510) of a material which is permeable to the energy crosslinking the starting material of the contact lens. Finally, a mask made of a material impermeable to the energy crosslinking the starting material is provided for spatially delimiting this energy. The mask comprises a separate surround (512) made of a material impermeable to the energy crosslinking the starting material of the contact lens, which surrounds the edge region of the shaping surface (510) of the insert (51, 51a).

20 Claims, 5 Drawing Sheets

FOREIGN PATENT DOCUMENTS

| | | |
|---|---|---|
| EP | 0 484 015 | 5/1992 |
| EP | 0 686 486 | 12/1995 |
| EP | 0 687 551 | 12/1995 |
| EP | 0 691 195 | 1/1996 |
| EP | 0 765 734 | 4/1997 |
| WO | WO 96/11782 | 4/1996 |
| WO | WO 00/59713 | 10/2000 |

\* cited by examiner

CASTING MOLD HALF AND CASTING MOLD FOR PRODUCING CONTACT LENSES

CROSS-REFERENCE TO RELATED APPLICATIONS

This application claims under 35 U.S.C. §119(a)–(d) or §365(b) of Europe Application No. 01811025.4 filed Oct. 19, 2001.

FIELD OF THE INVENTION

The invention relates to a casting mold half and a casting mold for producing contact lenses.

BACKGROUND OF THE INVENTION

In automatic contact lens production processes, in particular for the production of contact lenses which are to be produced cost-effectively in large numbers, the contact lenses are preferably produced by what is known as the mold or full-mold process. In these processes, the lenses are produced in their final shape between two casting mold halves (molds), so that neither subsequent machining of the surfaces of the lenses nor machining of the edge is required. Mold processes are described, for example, in WO-A-87/04390 or in the EP-A 0 367 513.

In these known mold processes, the geometry of the contact lens to be produced is established by the cavity defined between the casting mold halves. The edge of the contact lens is likewise formed by the casting mold, usually comprising two casting mold halves. The geometry of the edge is established by the contour of the two casting mold halves in the region in which they contact each other.

To produce a contact lens, firstly a specific amount of the flowable starting material is introduced into the female casting mold half. After that, the mold is closed by placing on the male casting mold half. It is customary for a little more starting material than is necessary to be fed in, so that, when the casting mold is closed, the excess amount is displaced into an overflow space adjoining the cavity on the outside. The subsequent polymerization or crosslinkage of the starting material takes place by irradiation with UV light or by heat exposure or some other non-thermal method. In this case, both the starting material in the cavity and excess material in the overflow space are cured. To obtain flawless separation of the contact lens from the excess material, good sealing and displacement of the excess material must be achieved in the contact zone of the two casting mold halves. Only in this way flawless contact lens edges can be obtained.

The contact lenses produced in this way are flexible, soft moldings with a water content of typically over 60% by weight. After its completion, the contact lens also undergoes verifying test measurements, is then packed and subjected to high-temperature sterilization (for example at 121° C.) in an autoclave.

Plastics, such as polypropylene for example, are used with preference as materials for these casting molds or casting mold halves. The molds are produced by injection molding and used only once. One reason for this is that the casting molds or casting mold halves are sometimes contaminated by the excess material, damaged when the contact lenses are detached or deformed irreversibly in partial regions when the casting mold is sealed. In particular because of the requirements demanded of the quality of the contact lens edge, the casting molds are used only once, since a certain deformation of the casting molds in their edge region cannot be ruled out with certainty.

U.S. Pat. No. 5,508,317 describes a novel contact lens material which represents an important improvement of the polymerizable starting materials for the production of contact lenses. The patent discloses a water-soluble composition of a prepolymer, which is filled into the cavity and subsequently crosslinked photochemically. The prepolymer carries a plurality of crosslinkable groups, and the crosslinkage process is distinguished by high speed, so that a finished contact lens of optical quality can be produced within a few seconds, without subsequent extraction or secondary finishing steps being required. Contact lenses can be produced at considerably lower costs by the improved starting material presented in the patent, so that as a result the production of disposable contact lenses is made possible.

EP-A-0 637 490 describes a method by which a further improvement of the production process for contact lenses can be achieved with the prepolymer described in U.S. Pat. No. 5,508,317. The starting material (prepolymer) is in this case filled into a casting mold comprising two casting mold halves, the two casting mold halves not being in contact with each other, but instead a thin, annular gap being arranged between them. The gap is in communication with the cavity, so that excess starting material (prepolymer) can flow away into the gap. The crosslinkage of the starting material takes place by irradiation, in particular with UV light, a delimitation of the irradiation to the mold cavity being achieved for example by a chromium mask. Consequently, only the material located in the cavity is crosslinked, so that a high degree of reproducibility of the edge shapes of the contact lens can be achieved without completely closing the two casting mold halves.

In this method, reusable quartz glass molds are used in practice, since, on account of the water-soluble starting material, they can be quickly and effectively cleaned of the uncrosslinked prepolymer and other residues and dried after a contact lens has been produced. Furthermore, quartz glass is distinguished by very good UV permeability and is very hard and resistant. In addition, quartz is an established substance as a carrier material for chromium masks in UV lithography.

In EP-A-0 941 829, use is made of the principles explained above for the efficient production of contact lenses. For this purpose, a molding tool which has two tool halves is proposed in EP-A-0 941 829. Each tool half has a number of receptacles, into which respectively complementary casting mold halves are inserted, to be precise for example female casting mold halves into one tool half and the associated male casting mold halves into the other tool half. The casting mold halves are clamped with high precision in the receptacles and, when the tool halves are closed, the tool halves and consequently the casting mold halves are positioned precisely in relation to one another.

Such a casting mold half clamped into a receptacle in each case comprises a mount, for example made of brass, which has a channel and a wall surrounding this channel. Provided at one end of the mount is an insert, which is accommodated by the mount and has a shaping surface for the shaping of the front or rear surface of the contact lens to be produced. The insert is produced, for example, from the quartz glass mentioned above, the previously already mentioned chromium mask being applied for example to the insert of the male casting mold half.

The chromium mask applied to the quartz glass has a layer thickness of about 0.3 $\mu$m and is preferably produced by processes known in photolithography or UV lithography. However, it is found that the chromium masks produced in this way often do not have the service lives required for an automatic production process and exhibit damage at an early time due to detachment of the chromium layer. Since, however, the inserts made of quartz glass with the chromium layer applied to them are very expensive to produce, the service lives of the casting molds should be very long to allow a cost-effective process to be ensured.

SUMMARY OF THE INVENTION

The object of the present invention is therefore to improve a casting mold or casting mold half of the generic type in such a way that the same edge quality of the contact lenses as with the previous casting molds or casting mold halves can be achieved. At the same time, however, the technical production-related expenditure for the casting molds or casting mold halves is to be reduced, and consequently further cost reductions are to be made possible for the production of contact lenses.

This object is achieved by a casting mold half according to the invention or a casting mold according to the invention as defined by the features of the respective independent patent claim. Further advantageous embodiments of the casting mold half or the casting mold emerge from the features of the dependent patent claims.

The object is achieved in particular by a casting mold half with a mount and with an insert (a placed-on attachment would also be possible), which is arranged at one end of the mount and can be connected to the mount and which has a shaping surface for the shaping of the front or rear surface of the contact lens to be produced. The insert consists in the region of the shaping surface of a material which is permeable to the energy crosslinking the starting material of the contact lens. Finally, the casting mold half comprises a mask made of a material impermeable to the energy crosslinking the starting material, for spatially delimiting this energy. The mask itself comprises a separate surround made of a material impermeable to the energy crosslinking the starting material of the contact lens, which surrounds the edge region of the shaping surface of the insert.

If, for whatever reason, the masking properties of the surround should happen to be no longer retained completely, for example on account of a material defect, it is merely necessary to exchange the surround—which after all is a separate part—and not for instance, as previously, to replace the entire quartz glass mold with the chromium mask applied to it, which is costly because applying the chromium mask to the quartz glass is a relatively complex technical process.

A separate surround can also be adapted in respect of its dimensions to the part of the insert with the shaping surface (for example by turning the inside diameter of the surround on a lathe), if the dimensions of the surround and of the part of the insert with the shaping surface should happen not quite to match one another optimally. In an advantageous exemplary embodiment of the casting mold half according to the invention, the surround is therefore produced from a material which can be machined.

In a development of this variant, the insert is likewise produced in the region of the shaping surface from a material which can be machined, and the material of the surround is formed in terms of its machining properties in such a way that it can be machined by the same cutting tool. Consequently, it is possible to rework both the shaping part and the surround (for example to remove a certain amount by turning on a lathe) from time to time, for example whenever deviations occur in the dimensional accuracy (geometry) of the contact lenses. In such a case, the remachined casting mold half (for example the remachined male casting mold half) can be reused together with the other (for example non-remachined female) casting mold half without further measures, as explained in more detail further below. The setting-up operation when setting up the molding tool in this case remains the same as in the case of a non-remachined casting mold half, as explained further below.

In a further exemplary embodiment of the casting mold half according to the invention, a separate diaphragm is arranged within the mount, near the insert with the shaping surface, to be precise upstream of the insert in the direction of the path of the energy. The diaphragm consists of a material which is impermeable to the energy crosslinking the starting material. The diaphragm has the effect that the energy is already delimited shortly before reaching the shaping part of the insert, and, for example in the case of UV light as the crosslinking energy, at most a slightly diverging UV light beam can pass through the diaphragm. Should the UV light beam nevertheless happen to diverge slightly, the UV light is delimited by the surround which surrounds the part of the insert with the shaping surface definitively at the desired location to the desired extent, i.e. in particular to the diameter of the contact lens.

In a development of this exemplary embodiment, the diaphragm is produced from a plastic, in particular an injection-moldable plastic, such as for example polyphenylene sulfone (PPSU, black). Such a material can be processed well, for example using the injection-molding technique or using the lhating technique, and, for example when UV light is used as the energy which crosslinks the starting material for the contact lenses, has the required impermeability to the UV light.

The diaphragm is preferably an insert part, which, when considered in the direction of the path of the energy, is arranged directly adjacent to the insert, so that the insert rests on the diaphragm. The insert part—the diaphragm—may in this case initially be pressed into the mount. Subsequently, that surface of the diaphragm (that is of the insert part) on which the insert or placed-on attachment comes to lie may be lathed or milled flat, for example, to be precise in particular to a level which corresponds to the level of a bearing surface of the mount surrounding the bearing surface of the diaphragm (of the insert part). The insert then rests both on the bearing surface of the diaphragm (that is of the insert part) and on the bearing surface of the mount, which then of course both lie at the same level.

In a development of the exemplary embodiment of the casting mold half with diaphragm, the inside diameter of the diaphragm is smaller than the inside diameter of the surround which surrounds the edge region of the shaping surface of the insert. Downstream of the diaphragm, when considered in the path of the UV light, the UV light beam may still have a certain divergence, until it impinges on the starting material for the contact lenses through the region with the shaping surface in the insert. The inside diameter of the diaphragm is therefore chosen to be smaller than the inside diameter of the surround, in order that, even taking into account a certain divergence of the light beam, as far as possible no UV light impinges on the starting material outside the desired region. The surround itself, which of course—like the annular insert part also—is produced from a material impermeable to the UV light (to the crosslinking energy), delimits the light beam once again, to be precise directly at the location where the UV light impinges on the starting material for the contact lenses.

In a further advantageous exemplary embodiment of the casting mold half according to the invention, that part of the insert on which the region with the shaping surface is provided is also produced from plastic. This allows parts with shaping surfaces which can be produced at low cost to be used.

For example, a polymethyl methacrylate (PMMA), which is adequately permeable to UV light as the crosslinking energy, may be used as the material for the part of the insert with the shaping surface. The surround consists for example of brass. These materials are advantageous to this extent, because they are already known for their suitability in the production of contact lenses and because they also have to a certain extent similar properties with regard to machining, so that the same tool can be used for the machining both of the part with the shaping surface and of the surround.

In a further exemplary embodiment, a closure which is permeable to the energy crosslinking the starting material is provided at that end of the mount which is facing away from the insert. One purpose of such a closure is to avoid contaminants in the interior of the mount, which may have disruptive effects on the impingement of the starting material with UV light. If the closure is also adequately transparent to visible light, an initial inspection of the contact lens for inclusions (for example bubbles) is also possible while it is still in the mold, as still to be explained.

A casting mold according to the invention for producing contact lenses comprises a male casting mold half and a female casting mold half, which have a shaping surface, respectively forming the rear and front surfaces of the contact lens, and which in the closed state define between them a cavity which substantially defines the shape of the contact lens. At least one of the casting mold halves, preferably the male casting mold half, is formed according to one of the exemplary embodiments described above.

Further advantageous refinements emerge from the exemplary embodiments described below with the aid of the drawing, in which:

DETAILED DESCRIPTION OF THE INVENTION

Figure 1:
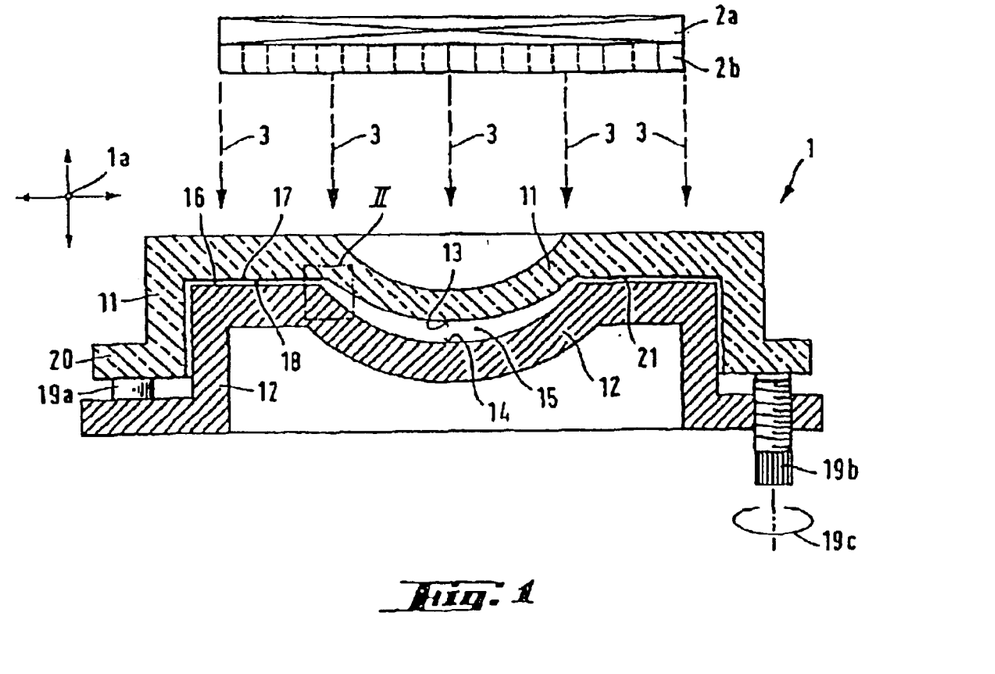
FIG. 1 shows a schematic representation of an embodiment of a casting mold known in the prior art.

The casting mold according to the prior art shown in FIG. 1 is designed for the production of contact lenses from a liquid starting material which can be polymerized or crosslinked by UV radiation. It comprises a casting mold 1 and an energy source 2a, here a UV light source, and also means 2b for directing the energy provided by the energy source 2a onto the mold in the form of a substantially parallel beam 3. It goes without saying that the energy source 2a and the means 2b can also be combined to form a single unit.

The casting mold 1 comprises two casting mold halves 11 and 12, which each have a curved shaping surface 13 and 14, respectively, which together define a cavity 15, which for its part in turn determines the shape of the contact lens to be produced. The shaping surface 13 of the casting mold half 11 that is the upper half in the drawing, known as the "male" casting mold half, is convex and determines the rear surface of the contact lens with the edge region of the same adjoining it. Conversely, the shaping surface 14 of the other casting mold half 12, which is correspondingly referred to as the "female" casting mold half, is of a concave form and determines the front surface of the contact lens to be produced, likewise with the edge region of the same adjoining it.

The cavity 15 is not closed off completely and in a sealed manner, but in the exemplary embodiment shown is open all around in the region of its peripheral edge, defining the edge of the contact lens to be produced, and is in communication with a relatively narrow annular gap 16. The annular gap 16 is delimited or formed by a planar mold wall 17 on the male casting mold half 11 and a planar mold wall 18 on the female casting mold half 12. To prevent complete closing of the mold, spacing means are provided on the female mold half 12, for example in the form of a plurality of spacing bolts 19a and 19b, which act together with a collar or flange 20 of the male casting mold half 11 and keep the two casting mold halves at such a distance that said annular gap 16 is produced. The casting mold is able to be opened and closed in the customary way, for example by means of a closing unit only indicated here by the arrow symbol 1a. The adjustment of the spacing of the two casting mold halves 11, 12 to compensate for shrinkage may also take place by means of this external closing unit, for example.

A mask 21, which is impermeable to the UV light (or at least very poorly permeable in comparison with the permeability of the of the material for the casting mold or casting mold half), is provided on the mold wall 17 in the region of the annular gap 16, extends right up to the cavity 15 and, with the exception of the same, shields from the irradiated energy all the remaining parts, hollow spaces or surfaces of the casting mold 1 which are in contact or could come into contact with the starting material, which here is liquid, uncrosslinked and possibly constitutes excess material.

In practice, the male casting mold half 11 is produced, for example, from quartz glass and is reusable. The mask 21 is a thin chromium layer, which is applied to the quartz glass by processes known for example from photolithography or UV lithography.

Figure 2:
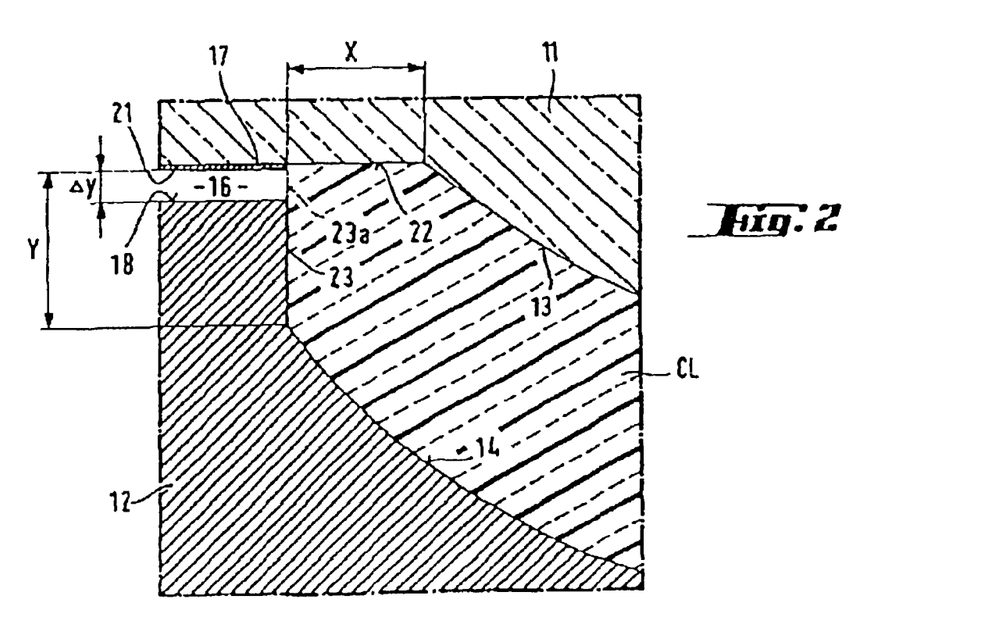
FIG. 2 shows the detail designated in FIG. 1 by II in a greatly enlarged representation

FIG. 2 shows the configuration of the casting mold 1 in the transitional region between the cavity 15 and the annular channel 16 in an enlarged representation. The cavity 15 has here, in the sense of an example, a shape which corresponds to the typical edge geometry of what is known as a soft contact lens CL. The edge of the cavity, and consequently of the lens, is formed here by two wall areas 22 and 23 at right angles to one another, which are respectively formed on the male casting mold half and the female casting mold half. The width and height of these two wall areas and of the edge regions of the contact lens defined by them are denoted by X and Y, respectively. In practice, the edge of the lens may also be rounded off. As can be clearly seen, the cylindrical wall area 23 of the female mold half 12 does not reach quite up to the planar wall area 22 or the wall area 17 of the male mold half 11 seamlessly adjoining it, but is less high by the amount Δy, so that the annular gap 16 is formed or remains free between the wall area 17 and the wall area 18 of the two mold halves.

The mask 21 provided on the wall area 17 of the male casting mold half 11 reaches horizontally right up to the extension 23a of the wall area of the female casting mold half 12. When the UV light effecting the crosslinkage in the form of a parallel beam 3 is incident perpendicularly to the wall area 22 or 17 or parallel to the cylindrical wall area 23, the space located perpendicularly below the mask 21 is occluded and only the starting material located within the cavity 15, that is within the imaginary extension of the wall 23a, is crosslinked, and a cleanly finished, burr-free lens edge which does not require mechanical secondary finishing is created. After the contact lens produced in this way has been removed from the mold, any still adhering uncrosslinked material is flushed away by means of a suitable solvent, which, depending on the material, may well be water.

Figure 3:
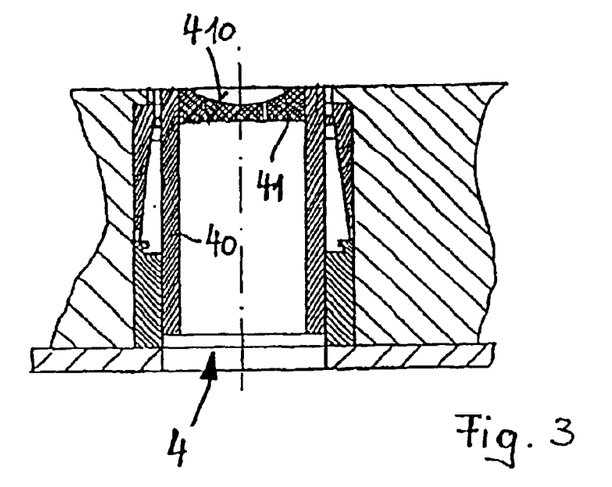
FIG. 3 shows a detail from a molding tool for the efficient production of contact lenses according to the prior art, with an exemplary embodiment of a female casting mold half.

A detail of a tool half of a molding tool according to the prior art, in which use is made of the principles explained above, can be seen in FIG. 3. It reveals a female casting mold half 4 which is accommodated in a receptacle of the tool half and comprises a mount 40 in which there is provided an insert 41 which has a shaping surface 410, here for shaping the front surface of a contact lens. The mount 40 is clamped with great precision in the receptacle with the aid of clamping means. In the case of the associated male casting mold half, the chromium mask described above is applied to the insert, which consists of quartz glass.

Figure 4:
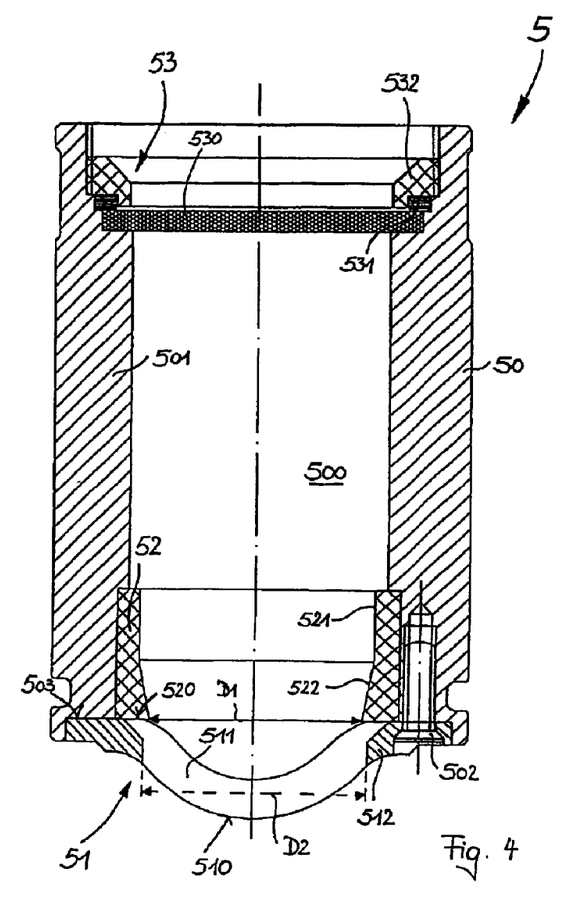
FIG. 4 shows a section through an exemplary embodiment of a male casting mold half according to the invention.

An exemplary embodiment of a casting mold half according to the invention in the form of a male casting mold half 5 is then represented in a longitudinal section in FIG. 4. It reveals a mount 50, which consists for example of brass, and which has a channel 500 and also a wall 501 surrounding this channel. FIG. 4 also reveals an insert 51, which is arranged at one end of the mount 50 and is fastened on the mount 50 by means of screws 502.

The insert 51 comprises a region with a shaping surface 510, which is formed here on a separate part 511, which is preferably produced from plastic, in particular from polymethyl methacrylate (PMMA). However, it may also be produced from glass, in particular from quartz glass. The separate part 511 with the shaping surface 510 is enclosed in an annular surround 512, which consists for example of brass and extends around the edge region of the shaping surface 510, that is around the separate part 511.

Figure 5:
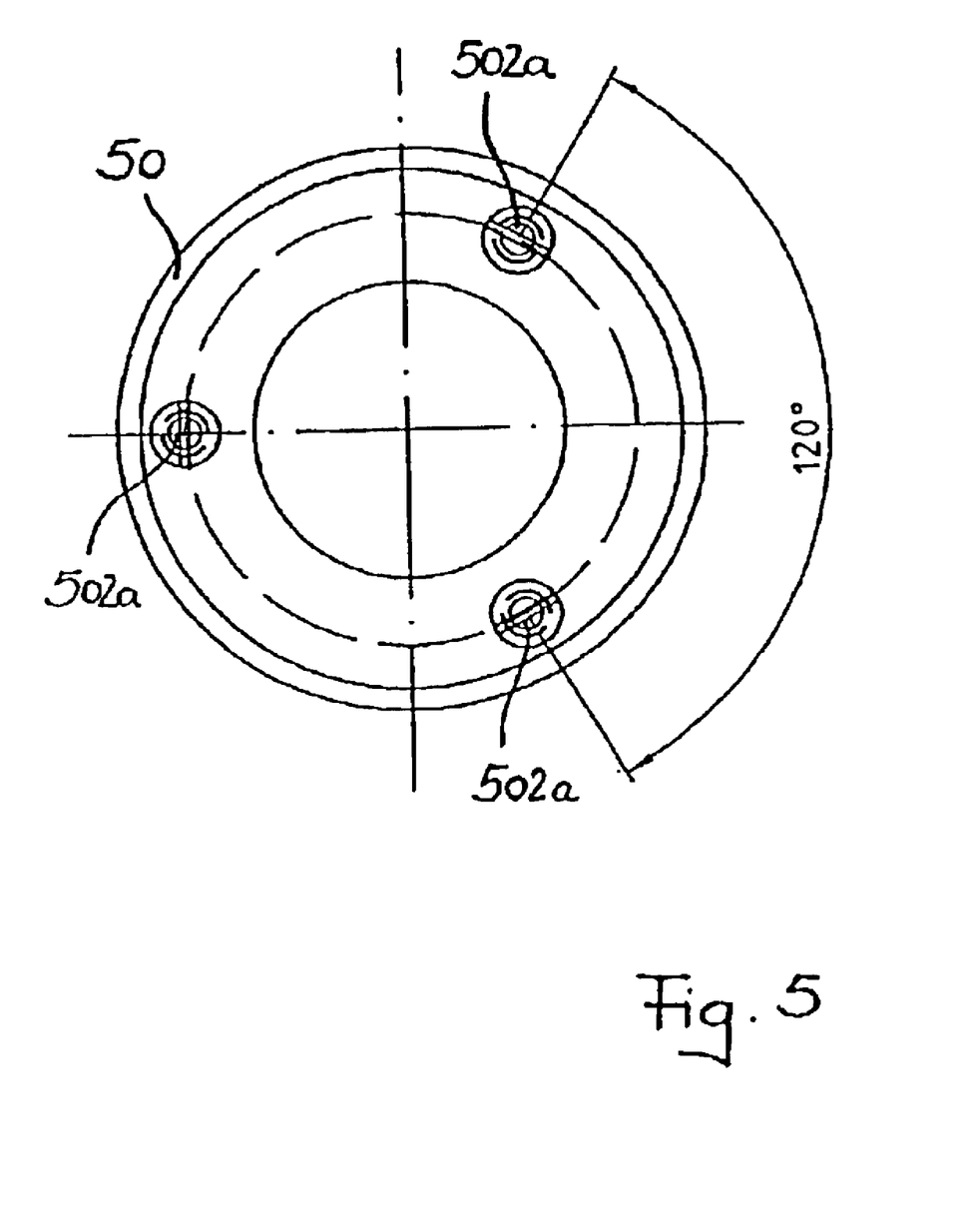
FIG. 5 shows a plan view of the casting mold half according to FIG. 4.

Arranged inside the mount 50, directly adjoining the insert 51, is a diaphragm 52 formed as a separate annular insert part, to be precise upstream of the insert 51 when considered in the direction of the light path of the UV light. The diaphragm 52 is produced from a material which is impermeable to UV light, in particular from an injection-moldable plastic, such as for example polyphenylene sulfone (PPSU, black). In the production of such a casting mold half 5, the diaphragm 52 formed as an insert part is pressed into the mount 50 and subsequently the surface 520 of the diaphragm 52 adjoining the insert 51 is lathed flat to the same level as the bearing surface 503 of the mount 50. Subsequently, the insert 51 is inserted into the mount 50 and connected to the mount 50 by means of three screws 502 (see screw holes 502a in FIG. 5). The insert 51 in this case rests both on the bearing surface 503 of the mount 50 and on the surface 520 of the diaphragm 52. The diaphragm 52 consequently not only brings about the delimitation of the UV light, but also improves the mechanical stability of the bearing for the insert 51.

The exemplary embodiment of the diaphragm 52 represented here firstly has a cylindrical portion 521, which is adjoined in the direction of the insert 51 by a slightly conical portion 522. This slightly conical portion 522 has in particular the function of reflecting UV light possibly reflected on it into the region of the shaping surface 510, and not for instance in a direction outside this region, which is also the reason why only a slight cone is provided. The inside diameter D1 of the diaphragm 52 at the end of the cone facing the insert 51 is somewhat smaller than the inside diameter D2 of the surround 512. The surround 512 spatially delimits the UV light definitively to the region of the shaping surface 510, which establishes the geometrical shape of the rear surface of the contact lens, to be precise directly at the location at which the UV light impinges on the starting material of the contact lens. A small divergence of the UV light beam after passing through the diaphragm 52 is consequently delimited by the surround 512 once again directly at the location at which it impinges on the starting material, so that the starting material is impinged with UV light only in the region of the shaping surface 510.

At the other end of the mount 50, that is at that end which is facing away from the insert 51, a closure 53 is provided for the channel 500. The closure 53 here comprises a disk 530, for example made of quartz glass, which is permeable to UV light, a sealing O-ring 531, and also a hold-down device 532 with an external thread, which can be screwed into a corresponding internal thread in the mount 50, so that the channel 500 is closed in a sealed manner and no contamination can penetrate. The quartz glass is not only suitable as a material for the disk 530, because of its UV permeability, but it also makes possible in particular (because of its permeability to visible light) an initial inspection of the contact lens for inclusions (for example bubbles) while the casting mold is still closed, that is through the disk 530.

Figure 6:
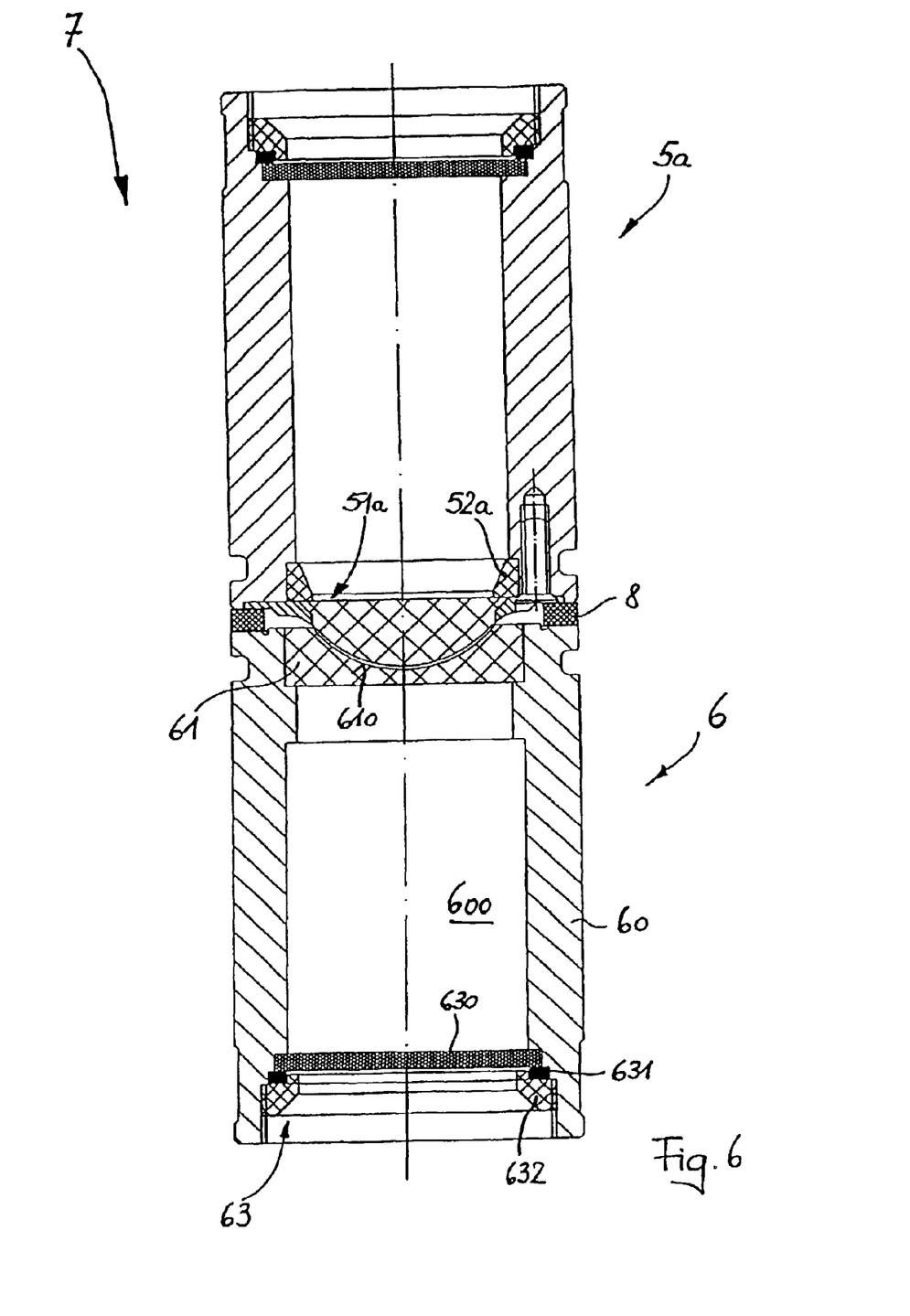
FIG. 6 shows a section through an exemplary embodiment of a casting mold according to the invention, with a male casting mold half and a female casting mold half.
Figure 7:
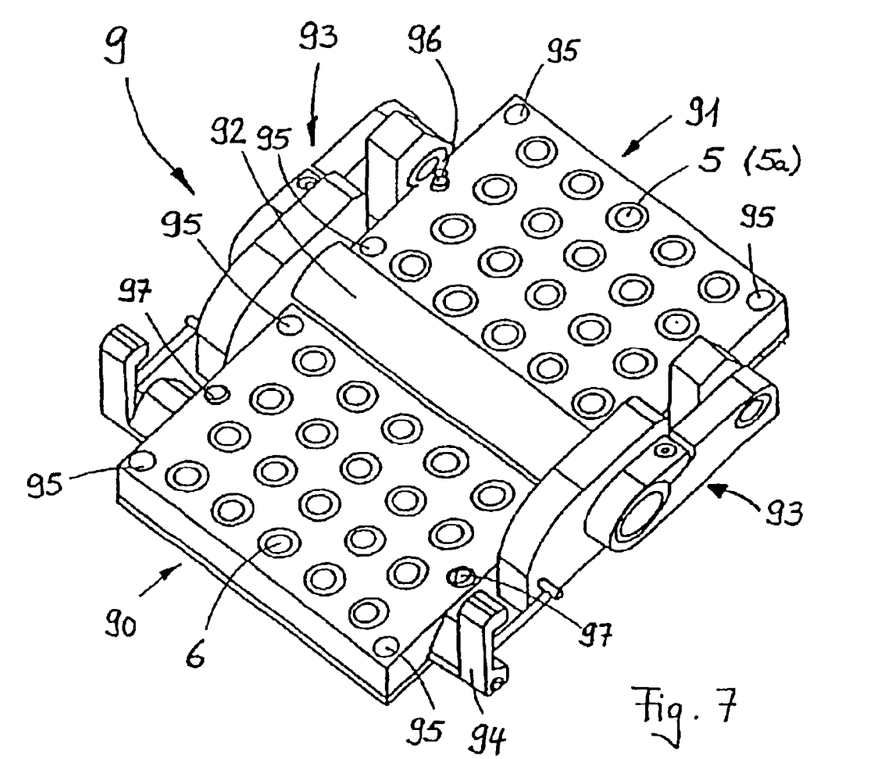
FIG. 7 shows a molding tool with two tool halves, a plurality of male or female casting mold halves being respectively arranged in each tool half.

FIG. 6 reveals an exemplary embodiment of a casting mold 7 according to the invention, as it is represented during setting-up, in particular during the setting-up of a molding tool (see also FIG. 7, still to be explained). The male casting mold half 5a in FIG. 6 is formed in a way very similar to the male casting mold half 5 explained above on the basis of FIG. 4.

Additionally provided is a female casting mold half 6, which is of a similar construction in principle to the male casting mold half. In particular, the female casting mold half 6 likewise comprises a mount 60, in which there is accommodated an insert 61 which has a shaping surface 610, which establishes the shape of the front surface of the contact lens to be produced. The female casting mold half 6 also has a closure 63 for the channel 600, with a disk 630, for example of quartz glass, which closes the channel 600 with the aid of a sealing O-ring 631 and with the aid of a hold-down device 632. In the case of such a casting mold 7, an initial inspection of the contact lens for inclusions (for example bubbles) in particular is still possible while the casting mold 7 is closed, as is directly evident since the light path through both casting mold halves 5a, 6 and also through the contact lens produced is undisturbed.

The diaphragm 52a of the male casting mold half 5a of the casting mold 7, formed as an annular insert part, is formed slightly differently in FIG. 6 than in the exemplary embodiment of the male casting mold half 5 in FIG. 4, but has the same function. What is more, the insert 51a of the casting mold half 5a is also differently formed to the extent that the inner surface of the insert 51a does not run approximately parallel in the same way as the shaping (outer) surface of the insert 51a, as is the case in the exemplary embodiment of the casting mold half 5 in FIG. 4. Rather, in the exemplary embodiment of the casting mold half 5a according to FIG. 6 it is the case that the inner surface of the insert 51a is of a flat form. In principle, both described variants are possible; which variant is to be preferred depends on the respective materials chosen for the inserts 51 and 51a, on the UV permeability and on the requirements demanded of the mechanical stability of the insert, etc.

FIG. 6 also reveals a spacer 8, which is formed here as a ring and is arranged between the two casting mold halves 5a and 6 during the setting-up of the tool 9 and plays an important part during the setting-up. The spacer 8 is a part produced with high precision which has a very low tolerance and ensures that the two casting mold halves 5a and 6 are at a precisely defined distance from each other. In this state, the respective male casting mold half 5 or 5a and the respective female casting mold half 6 is clamped with great precision in the receptacle of the respective tool half 90 and 91 of the tool 9 (see FIG. 3 and FIG. 7).

For this purpose, the tool 9 represented in FIG. 7 must be closed. After the various casting mold halves 5 or 5a and 6 have been clamped in the receptacles of the tool halves 90 and 91, respectively, the tool 9 can be opened again and the spacers 8 can be removed, because then the casting mold halves 5 or 5a and 6 are clamped in the respective tool half 90 and 91 in such a way that they are very precisely at the desired distance from each other when the tool 9 is closed, because the casting mold halves 5 or 5a and 6 have of course been clamped in the respective tool half 90 or 91 precisely at this distance from each other (spacers 8) beforehand with the tool 9 closed during the setting-up of the tool 9. In the closed state of the tool 9, the cavity formed between the two mold halves 5 or 5a and 6, which defines the shape of the contact lens, is slightly open at the edge, that is to say there is an annular gap (see explanation further above), through which any extra starting material can flow into the cavity.

Once the casting mold halves 5 or 5a and 6 have been definitively clamped in the two tool halves 90 and 91 and the spacers 8 have been removed, the tool 9 can be closed after starting material has been dispensed into the female casting mold halves 6 or into the insert 61 with the tool 9 open. Since it is customary for a little more starting material than is necessary to be fed in, excess material is displaced through the annular gap, but any extra material may also flow through the annular gap back into the cavity. When the tool 9 is closed, the tool half 91 in which the male casting mold halves 5 and 5a are clamped is swung shut by the tool half 91 being pivoted about the joint 92. The pivoting takes place with the aid of a movement guide 93 known per se, the two tool halves 90, 91 being held together in the closed state by a latching lever 94. Provided on the mutually facing upper sides of the tool halves 90 and 91 are defined contact surfaces 95 (here, four on each tool half 90 and 91, only three being visible in each case), which come to bear against one another when the tool 9 is closed. A precise alignment of the two tool halves 90, 91 during closing, and consequently a precise alignment of the casting mold halves 5 or 5a and 6 in relation to one another, is achieved with the aid of positioning bolts 96 and corresponding positioning bushes 97, the positioning bolts 96 being provided on the one tool half 91 and the positioning bushes 97 being provided on the other tool half 90, and the positioning bolts 96 entering into the positioning bushes 97 when the tool is closed.

In principle, the precise alignment of the casting mold halves in relation to one another can also take place in some other way; numerous possibilities for this are known from the prior art. The above description of the precise positioning of tool halves in which individual casting mold halves are clamped with high precision represents only one of many possible ways in which such an alignment of complementary casting mold halves in relation to one another can be performed.

If, for example, the male casting mold half 5a has to be reworked, because for example the contact lens produced with it has a dimensional inaccuracy of the contact lens rear surface, the entire "end" face of the male casting mold half 5a facing the female casting mold half 6 (insert together with surround and outer mount) can be lathed until it again has the desired preset geometry with dimensional accuracy over the entire "end" face. The setting-up operation during the setting-up of the tool 9 remains unchanged, as described above, because both the "end" face of the surround around the edge region of the shaping surface and the corresponding "end" face of the surround arranged around the latter have of course been lathed by the same amount to the same level and the spacer 8 rests on these two "end" faces during the setting-up. The remaining "end" faces are also turned to their associated preset geometry, so that altogether in such a remachining operation the casting mold half 5a is shortened somewhat in its overall length (to be precise by the amount of the turned material), but the overall "end" face is returned to its preset geometry.

Coming into consideration as materials for the inserts permeable to UV light that are used for the casting mold halves are, in particular, the materials PMMA GS 2458 from Röhm GmbH Chemische Fabrik, Kirchenallee, D-64293 Darmstadt, Oroglas VS UVT glass-clear from Polymerland Kunststoff GmbH, Industriestrasse 28a, D-68519 Viernheim, Lucryl G77 from BASF Aktiengesellschaft, D-67056 Ludwigshafen, Zeonex from Nippon Zeon Co., Ltd, Furakawa Sogo Building 2-6-1 Marunochi Chioda-ku, Tokyo 100, Japan, and also Tobas from Ticona GmbH, Lyoner Str. 38, D-60528 Frankfurt/Main.

Coming into consideration as materials for the diaphragm are, in particular, the already mentioned polyphenylene sulfone PPSU, black, from Ensinger GmbH & Co., Technische Kunststoffe, Rudolf-Diesel-Strasse 8, D-71154 Nurfingen, and also POM (polyoxymethylene) from the same company, and similarly for example burnished brass or blackened aluminum. Apart from the brass already mentioned, coming into consideration for the surround are in principle also aluminum, steel, PPSU black, PEEK black, POM black, and also PMMA black, it having to be ensured that, depending on the direction in which the light is proceeding, the surrounds are as thin as desired at the transition to the edge region of the shaping surface, so that the materials used for the surround also have to be sufficiently impermeable to the UV light that the high quality of the edge of the contact lens cannot be impaired by stray UV light which impinges on the starting material outside the desired region and deviating from the direction of incidence of the UV light.

Finally, apart from the brass material already cited, coming into consideration for the mount are also aluminum, steel or PEEK.

What is claimed is:

1. A casting mold half for producing contact lenses from a starting material, comprising:
   a mount;
   an insert, wherein the insert is arranged at one end of the mount and can be connected to the mount and has a shaping surface for the shaping of the front or rear surface of the contact lens to be produced, the insert consisting in the region of the shaping surface of a material which is permeable to an energy for crosslinking the starting material; a mask for spatially delimiting the energy for crosslinking the starting material, wherein the mask is made of a material impermeable to the energy for crosslinking the starting material, wherein the mask comprises a separate surround which is made of a material impermeable to the energy for crosslinking the starting material and which surrounds the edge region of the shaping surface of the insert, and
   in which a separate diaphragm is arranged within the mount.

2. The casting mold half according to claim 1, in which the mount is produced from a material which can be machined.

3. The casting mold half according to claim 2, in which the insert is likewise produced in the region of the shaping surface from a material which can be machined by a cutting tool, and in which the material of the surround is formed in terms of its machining properties in such a way that it can be machined by the same cutting tool.

4. The casting mold half according to claim 1, in which said separate diaphragm arranged within the mount is near the insert with the shaping surface, to be precise upstream of the insert in the direction of the path of the energy, the diaphragm consisting of a material which is impermeable to the energy for crosslinking the starting material.

5. The casting mold half according to claim 4, in which the diaphragm is produced from a plastic.

6. The casting mold half according to claim 4, in which the diaphragm is an insert part, which, when considered in the direction of the path of the energy, is arranged directly adjacent to the insert, so that the insert rests on the insert part.

7. The casting mold half according to claim 1, in which the inside diameter of the diaphragm is smaller than the inside diameter of the surround, which surrounds the region with the shaping surface.

8. The casting mold half according to claim 1, in which the part of the insert on which the region with the shaping surface is provided is produced from plastic.

9. The casting mold half according to claim 1, in which the insert in the region of the shaping surface consists of polymethyl methacrylate and the surround consists of brass.

10. The casting mold half according to claim 1, in which a closure which is permeable to the energy crosslinking the starting material is provided at that end of the mount which is facing away from the insert.

11. A casting mold for producing contact lenses, comprising a male casting mold half and a female casting mold half, wherein the male and female casting mold halves have a shaping surface, respectively forming the rear and front surfaces of a contact lens, wherein when in the closed state the male and female casting mold halves define between them a cavity which substantially defines the shape of the contact lens, and wherein at least one of the casting mold halves comprises: a mount; an insert, wherein the insert is arranged at one end of the mount and can be connected to the mount and has a shaping surface for the shaping of the front or rear surface of the contact lens to be produced, the insert consisting in the region of the shaping surface of a material which is permeable to an energy for crosslinking the starting material; and a mask for spatially delimiting the energy for crosslinking the starting material, wherein the mask is made of a material impermeable to the energy for crosslinking the starting material, wherein the mask comprises a separate surround which is made of a material impermeable to the energy for crosslinking the starting material and which surrounds the edge region of the shaping surface of the insert, and in which a separate diaphragm is arranged within the mount.

12. The casting mold half according to claim 2, in which said separate diaphragm is arranged within the mount, near the insert with the shaping surface, to be precise upstream of the insert in the direction of the path of the energy, the diaphragm consisting of a material which is impermeable to the energy for crosslinking the starting material.

13. The casting mold half according to claim 3, in which said separate diaphragm is arranged within the mount, near the insert with the shaping surface, to be precise upstream of the insert in the direction of the path of the energy, the diaphragm consisting of a material which is impermeable to the energy for crosslinking the starting material.

14. The casting mold half according to claim 5, in which the diaphragm is an insert part, which, when considered in the direction of the path of the energy, is arranged directly adjacent to the insert, so that the insert rests on the insert part.

15. The casting mold half according to claim 5, in which the inside diameter of the diaphragm is smaller than the inside diameter of the surround, which surrounds the region with the shaping surface.

16. The casting mold half according to claim 6, in which the inside diameter of the diaphragm is smaller than the inside diameter of the surround, which surrounds the region with the shaping surface.

17. The casting mold half according to claim 5, in which the inside diameter of the diaphragm is smaller than the inside diameter of the surround, which surrounds the region with the shaping surface.

18. The casting mold half according to claim 6, in which the inside diameter of the diaphragm is smaller than the inside diameter of the surround, which surrounds the region with the shaping surface.

19. The casting mold half according to claim 5, in which the diaphragm is produced from polyphenylene sulfone.

20. The casting mold half according to claim 4, in which a closure which is permeable to the energy crosslinking the starting material is provided at that end of the mount which is facing away from the insert.

* * * * *